United States Patent Office 3,274,233
Patented Sept. 20, 1966

3,274,233
PROCESS OF PREPARATION OF UNSATURATED TRICYCLIC ESTERS
Robert Joly, Montmorency, Julien Warnant, Neuilly-sur-Seine, and Bernard Goffinet, Paris, France, assignors to Roussel-UCLAF, Paris, France, a corporation of France
No Drawing. Filed Dec. 19, 1962, Ser. No. 245,656
Claims priority, application France, Dec. 27, 1961, 883,154
9 Claims. (Cl. 260—473)

The present invention relates to an improved process of preparation of the lower alkyl ester of 1-oxo-8-lower alkyl - 4,5 - (4' - methoxybenzo) - $\Delta^{3(9)}$ - hydrindene-3-carboxylic acid, of Formula II:

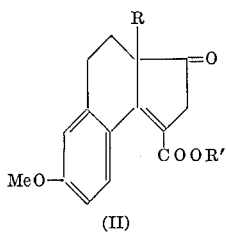

(II)

starting from 2-cyano-2-lower alkyl-6-methoxytetralone-1, of Formula I:

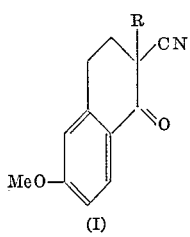

(I)

R and R' being lower alkyl radicals.

The lower alkyl esters of 1-oxo-8-lower alkyl-4,5-(4'-methoxybenzo)-$\Delta^{3(9)}$-hydrindene-3-carboxylic acid of Formula II are intermediate products useful in the total synthesis of steroids (see particularly Velluz et al., Angew. Chemie, 1960, 72, 726, or Tetrahedron Letters, No. 3, 1961, p. 127).

Until the present invention, the compounds of Formula II were generally obtained according to the method of Stobbe for the condensation from compounds of Formula I. Banerjee et al., J. Am. Chem. Soc., 1956, 78, 3769, for example, prepared the methyl ester of 1-oxo-8-methyl-4,5-(4'-methoxybenzo)-$\Delta^{3(9)}$-hydrindene-3-carboxylic acid (II with R=R'=CH$_3$) by the condensation of 2-cyano-2-methyl-6-methoxytetralone-1 (I, R=CH$_3$) with dimethyl succinate in tert.-butyl alcohol and in the presence of potassium tert.-butylate, followed by acidification with hydrochloric acid.

The invention has for its object an improved process for the production of lower alkyl esters of 1-oxo-8-lower alkyl - 4,5 - (4' - methoxybenzo) - $\Delta^{3(9)}$ - hydrindene-3-carboxylic acid by the condensation of 2-cyano-2-lower alkyl-6-methoxytetralone-1 with a di-lower alkyl succinate.

These and other objects of the invention will become more apparent as the description thereof proceeds.

According to the process of the invention, much more elevated yields are obtained if this condensation between a 2-cyano-2-lower alkyl-6-methoxytetralone-1 and a di-lower alkyl succinate is effected in the presence of a disubstituted amide of an alkanoic acid and in the presence of a solid anhydrous alkali metal alkanolate.

The preferred disubstituted amide of an alkanoic acid has the formula

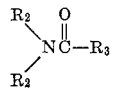

wherein $R_2$ is lower alkyl and $R_3$ is a member selected from the group consisting of hydrogen and alkyl having 1 or 2 carbon atoms. Among such disubstituted amides of alkanoic acids are, for example, dimethylformamide, diethylformamide, dimethylacetamide, dimethylpropionamide, methylethylformamide, etc. The preferred alkali metal alkanolate is a lower alkanolate such as sodium methylate or sodium ethylate.

According to a particular mode of execution, dimethylformamide is utilized as the disubstituted amide of an alkanoic acid and solid sodium methylate of commerce is utilized as the solid, anhydrous alkali metal alkanolate.

As a further and secondary improvement of the process of the invention, the intermediate condensation product formed between a 2-cyano-2-lower alkyl-6-methoxytetralone-1 and a di-lower alkyl succinate is hydrolyzed by the action of an aqueous solution of ammonium chloride and finally the product is decarboxylated by acidification with formic acid or oxalic acid or other strong organic carboxylic acids in place of utilizing strong mineral acids.

All the reaction steps should be conducted at temperatures between about $-15°$ C. and about $+15°$ C. Preferably the condensation and hydrolysis steps should be conducted at temperatures between about $-10°$ C. and about $+10°$ C.

The following examples illustrate the invention without, however, limiting it. It will be understood that other expedients known in the art may be employed.

EXAMPLE I

*Preparation of the methyl ester of 1-oxo-8-methyl-4,5-(4'-methoxybenzo)-$\Delta^{3(9)}$-hydrindene-3-carboxylic acid (II, with R=R'=CH$_3$)*

50 gm. of 2-cyano-2-methyl-6-methoxytetralone-1 (I, R=CH$_3$) were introduced under agitation and under a current of nitrogen into 100 cc. of dimethylformamide. Then 31.8 cc. of dimethyl succinate were introduced. Dissolution of 2-cyano-2-methyl-6-methoxytetralone-1 occurred very rapidly and the clear yellow solution was cooled to $-10°$ C. 22.6 gm. of dry, solid sodium methylate were then added to this cooled solution. The temperature of the reaction mixture was allowed to mount by itself to $-2°$ to $-3°$ C. over a period of about 5 minutes. Then the temperature was maintained for a period of 8 hours between $-5°$ and $0°$ C. by exterior cooling with the aid of a refrigerant mixture and without interrupting the agitation or the nitrogen atmosphere. In proportion and as the reaction progressed, the reaction mixture became more viscous taking toward the end of the reaction the aspect of a golden-yellow emulsion. After agitating for 8 hours, the reaction mixture was cooled to $-5°$ C. and an iced solution of 50 gm. of ammonium chloride in 500 cc. of water was added thereto. This produced an exothermic reaction and, although the refrigerating mixture of the exterior bath was at a temperature of $-10°$ C., the temperature of the reaction mixture reached $+5°$ C. At the same time the solution became colorless. A crystallization occurred and evolution of ammonia was noted. The reaction mixture was maintained for ¼ hour at a temperature between $0°$ and $+5°$ C. under agitation and a current of nitrogen. Then, to the pale yellow suspension so obtained, 150 cc. of formic acid, cooled to $0°$ C., as obtained by dilution of 75 cc. of 98–99% formic acid with an equal volume of water, were added over a period of about 2 minutes. The temperature of the reaction mixture reached +6° C. It was determined that the pH of the reaction mixture was equal to 3. The mixture was agitated, always under a current of nitrogen, until carbon dioxide gas ceased to be evolved which required about 4 hours. The pale yellow suspension formed of the methyl ester of 1-oxo-8-methyl - 4,5 - (4'-methoxybenzo)-Δ³⁽⁹⁾-hydrindene-3-carboxylic acid was vacuum filtered and washed abundantly by trituration with water. After vacuum filtering completely, about 170 gm. of the moist methyl ester of 1-oxo-8 - methyl - 4,5 - (4'-methoxybenzo)-Δ³⁽⁹⁾-hydrindene-3-carboxylic acid were obtained. This product was triturated at room temperature with equal volume of acetone. 50 cc. of an aqueous solution of ammonia, prepared by dilution of 25 cc. of concentrated ammonium hydroxide of commerce with an equal volume of water, were then added over a period of about 5 minutes. It was determined that the pH was alkaline. The reaction mixture was allowed to stand for 5 minutes under agitation and a current of nitrogen, diluted with water and vacuum filtered. The product was washed with water by trituration until the wash waters were neutral. After vacuum filtration and drying under vacuum, 55.9 gm. of the methyl ester of 1-oxo-8-methyl-4,5-(4'-methoxybenzo)-Δ³⁽⁹⁾-hydrindene-3-carboxylic acid (II, R=R'=CH₃) were obtained (being a yield of 84%). The melting point was 121° C. On trituration with isopropyl ether, the melting point reached 122° C., the yield was 82%, the weight of product obtained being 54.5 gm.

It is to be understood and without departing from the body of the invention that one can utilize other di-lower alkyl esters of succinic acid in order to obtain other lower alkyl esters than the methyl ester of 1-oxo-8-methyl - 4,5-(4'-methoxybenzo)-Δ³⁽⁹⁾-hydrindene-3-carboxylic acid. Thus, while operating as has been indicated above with di-isopropyl succinate in place of dimethyl succinate, the isopropyl ester of 1-oxo-8-methyl-4,5-(4'-methoxybenzo)-Δ³⁽⁹⁾-hydrindene-3-carboxylic acid

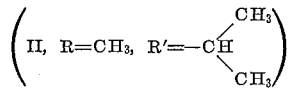

was obtained.

EXAMPLE II

*Preparation of the methyl ester of 1-oxo-8-n-propyl-4,5-(4'-methoxybenzo)-Δ³⁽⁹⁾-hydrindene-3-carboxylic acid*

(II, with R=—CH₂—CH₂—CH₃, R'=CH₃)

500 gm. of 2-cyano-2-n-propyl-6-methoxytetralone-1 (I, with R=CH₂—CH₂—CH₃) were dissolved in 1250 cc. of dimethylformamide heated to 70° C. 600 cc. of dimethyl succinate were added thereto and the reaction mixture was cooled to —5° C. 250 gm. of dry, solid sodium methylate were then introduced. An exothermic reaction was produced which lasted about 2 hours and the sodium methylate was progressively dissolved. The reaction mixture was agitated while being maintained at about 0° C. for a period of 6 hours.

A solution of 500 gm. of ammonium chloride in a mixture of 10 liters of water and ice was added. The reaction mixture was agitated for a period of some 10 minutes. Then, after the addition of 3 liters of isopropyl ether, 1.5 liters of an aqueous solution containing 50% of formic acid were introduced very slowly over a period of about ½ hour. A strong evolution of carbon dioxide gas was produced. The mixture was agitated at room temperature overnight. Next, another 3 liters of isopropyl ether were added. The reaction mixture was agitated, filtered and the filtrate was poured into water. The water was decanted from the isopropyl ether layer. The organic phase was washed successively with a saturated solution of sodium bicarbonate, then several times with N sodium hydroxide solution and finally with water. The organic phase was dried over magnesium sulfate, filtered and evaporated to dryness under vacuum.

The residue was recrystallized in isopropyl ether and supplied 377 gm. (being 58.5%) of the methyl ester of 1 - oxo - 8-n-propyl-4,5-(4'-methoxybenzo)-Δ³⁽⁹⁾-hydrindene - 3 - carboxylic acid (II, R=—CH₂—CH₂—CH₃, R'=CH₃), having a melting point of 84.5° C., then 94° C.

It is to be understood that in order to prepare other lower alkyl esters of 1-oxo-8-n-propyl-4,5-(4'-methoxybenzo)-Δ³⁽⁹⁾-hydrindene-3-carboxylic acid (II, R=CH₂—CH₂—CH₃)

it is necessary to take as the starting compound the desired lower alkyl ester of succinic acid. Thus, by using diethyl succinate or di-propyl succinate, compound II is obtained where R=—CH₂—CH₂—CH₃ with R' respectively equal to —CH₂—CH₃ or —CH₂—CH₂—CH₃.

The preceding examples are illustrative of the invention. It is to be understood, however, that other expedients known to the art may be employed without departing from the spirit of the invention or the scope of the appended claims.

We claim:

1. A process for the preparation of a lower alkyl ester of 1-oxo-8-lower alkyl-4,5-(4'-methoxybenzo)-Δ³⁽⁹⁾-hydrindene-3-carboxylic acid which comprises the steps of dissolving 2-cyano-2-lower alkyl-6-methoxytetralone-1 and a di-lower alkyl succinate, in solution in a solvent amount of a disubstituted amide of an alkanoic acid, adding a solid, anhydrous alkali metal alkanolate, reacting the reactants at a temperature between about —15° C. and +15° C., hydrolyzing the reaction product, acidifying the reaction mixture with a strong organic carboxylic acid and recovering said lower alkyl ester of 1-oxo-8-lower alkyl - 4,5-(4'-methoxybenzo)-Δ³⁽⁹⁾-hydrindene-3-carboxylic acid.

2. The process of claim 1 wherein said disubstituted amide of an alkanoic acid has the formula

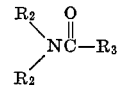

wherein R₂ is lower alkyl and R₃ is a member selected from the group consisting of hydrogen and alkyl having 1 to 2 carbon atoms and said alkali metal alkanolate is an alkali metal lower alkanolate.

3. A process for the preparation of a lower alkyl ester of 1-oxo-8-lower alkyl-4,5-(4'-methoxybenzo)-Δ³⁽⁹⁾-hydrindene-3-carboxylic acid which comprises the steps of dissolving 2-cyano-2-lower alkyl-6-methoxytetralone-1 and a di-lower alkyl succinate, in solution in a solvent amount of a disubstituted amide of an alkanoic acid having the formula

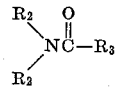

wherein R₂ is lower alkyl and R₃ is a member selected from the group consisting of hydrogen and alkyl having 1 to 2 carbon atoms, adding a solid, anhydrous alkali metal lower alkanolate, reacting the reactants at a temperature between —15° C. and +15° C., reacting the reaction product with an aqueous solution of ammonium chloride, acidifying the reaction mixture with a strong organic carboxylic acid and recovering said lower alkyl ester of 1-oxo-8-lower alkyl-4,5-(4'-methoxybenzo)-Δ³⁽⁹⁾-hydrindene-3-carboxylic acid.

4. The process of claim 3 wherein said disubstituted amide of an alkanoic acid is dimethyl formamide.

5. The process of claim 3 wherein said alkali metal lower alkanolate is sodium methylate.

6. The process of claim 3 wherein said strong organic carboxylic acid is formic acid.

7. The process of claim 3 wherein the starting compounds are 2-cyano-2-methyl-6-methoxytetralone-1 and dimethyl succinate and the methyl ester of 1-oxo-8-methyl - 4,5-(4'-methoxybenzo)-Δ³⁽⁹⁾-hydrindene-3-carboxylic acid is obtained.

8. The process of claim 3 wherein the starting compounds are 2-cyano-2-n-propyl-6-methoxytetralone-1 and dimethyl succinate and the methyl ester of 1-oxo-8-n-propyl - 4,5 - (4'-methoxybenzo)-Δ³⁽⁹⁾-hydrindene-3-carboxylic acid is obtained.

9. A process for the preparation of a lower alkyl ester of 1-oxo-8-lower alkyl-4,5-(4'-methoxybenzo)-Δ³⁽⁹⁾-hydrindene-3-carboxylic acid which comprises the steps of dissolving 2-cyano-2-lower alkyl-6-methoxy-tetralone-1 and dimethyl succinate in solution in a solvent amount of dimethylformamide, adding dry, solid sodium methylate, reacting the reactants at a temperature of from about −15° C. to +15° C., reacting the reaction product with an aqueous solution of ammonium chloride, acidifying the reaction mixture with a concentrated aqueous solution of formic acid and recovering said lower alkyl ester of 1-oxo-8-lower alkyl-4,5-(4'-methoxybenzo)Δ³⁽⁹⁾-hydrindene-3-carboxylic acid.

References Cited by the Examiner
UNITED STATES PATENTS 3,115,507   12/1963   Nomine et al. _____ 260—473

OTHER REFERENCES

Johnston et al.: J. American Chemical Soc., 69, pp. 2942–55 (1947).

LORRAINE A. WEINBERGER, *Primary Examiner.*

LEON ZITVER, *Examiner.*

M. S. JAROSZ, S. B. WILLIAMS, *Assistant Examiners.*